May 3, 1966 A. F. HANKEN 3,249,865
COMPENSATION OF DIELECTRIC GAUGE SYSTEMS FOR NON-UNIFORM
DISTRIBUTION OF THE CONSTITUENTS IN MEASURED MATERIALS
Filed Oct. 12, 1962 2 Sheets-Sheet 1

INVENTOR
Albert F. Hanken
by S. Henry Peterson
AGENT

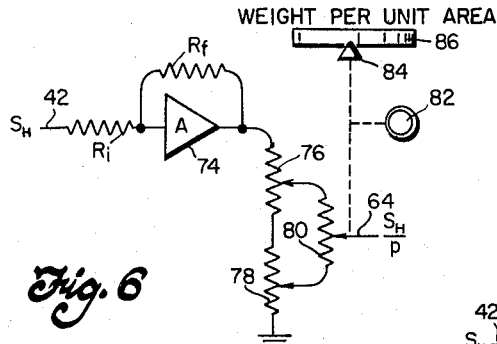
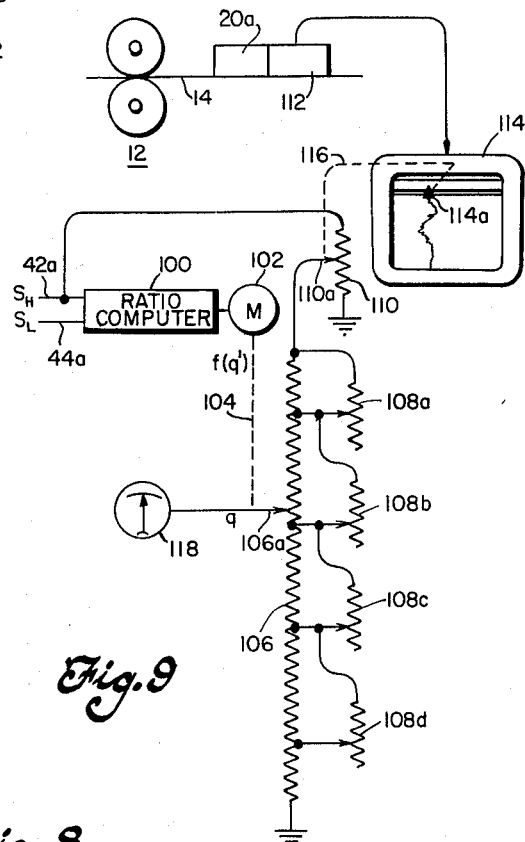
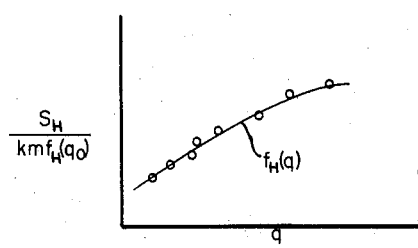
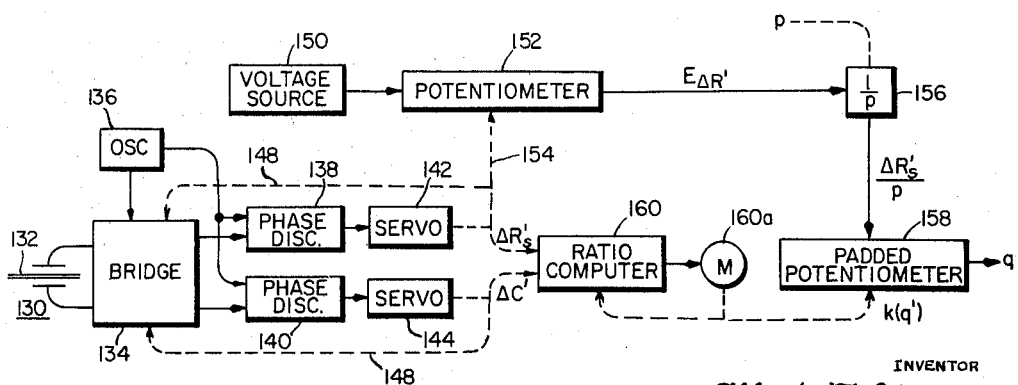

United States Patent Office 3,249,865
Patented May 3, 1966

3,249,865
COMPENSATION OF DIELECTRIC GAUGE SYSTEMS FOR NON-UNIFORM DISTRIBUTION OF THE CONSTITUENTS IN MEASURED MATERIALS
Albert F. Hanken, Columbus, Ohio, assignor to Industrial Nucleonics Corporation, a corporation of Ohio
Filed Oct. 12, 1962, Ser. No. 230,167
13 Claims. (Cl. 324—61)

This invention relates to instruments utilizing an electrical capacitor as a probe or sensing element for measuring the variable properties of materials, and more specifically it relates to a system for eliminating errors in the readings of such instruments due to the effects of inhomogeneity in the mixtures, compounds or physical structures constituting the measured materials.

A problem often arises, for example, in the measurement of moisture in solid materials when an attempt is made to correlate the readings of a capacitance gauge with gravimetric oven determinations. It is of course well known that the readings of an ordinary capacitance-type moisture gauge are influenced by variations in the mass of the measured material. However, there is not such a universal awareness of the further fact, reported by careful researchers, that even when full compensation is made for mass variations, the capacitance gauge tends to render a high and erroneous reading when there is a non-uniform distribution of the moisture in the material. It is found that up to twelve hours' hermetic storage thereof is often required before the moisture distribution becomes fully uniform, as attested by the eventaul correctness of the capacitance gauge indication.

In my copending application Serial No. 41,975, filed July 11, 1960, now Patent No. 3,155,900, there is described a capacitance gauge instrument energized with two significantly different radio frequencies, and an associated computer system for mathematically combing the responses of the instrument obtained at the respective frequencies, whereby a moisture indication independent of mass variations is obtained. However, it is found that this instrument is no better able to eliminate the inhomogeneity effect than any conventional mass-compensation method. It can be said that the development of the mass-insensitive instrument has advanced the art to the point where the inhomogeneity effect, which formerly went unrecognized or had to be tolerated, now becomes a matter of primary importance to the further development of these instruments.

The present invention is based on the following considerations. In a capacitance gauge, the material to be measured is subjected to an electromagnetic field permeating a space adjacent to the probe capacitor electrodes. The portion of this field-permeated space which can be occupied by the material constitutes a certain volume V, although in the case of solid materials, in normal gauge operation the space actually occupied, designated as $V_1$, is usually less than V. Now, hypothetically, if the material present were to be compressed to such an extent that all air spaces or voids therein were eliminated the material would occupy a volume $V_2$. From this we define a "filling factor," herein represented by the letter $p$, such that $p=V_2/V$. Obviously this quantity is directly proportional to the mass of material undergoing measurement; its value never exceeds unity (which obtains in the case of liquids) and is almost always less than unity in the case of solid materials.

When the measured material has a uniform, homogeneous constitution, the space $V_1$ is permeated with a substantially uniform electric field, and all incremental portions of the material in said space contribute equally to the output response of the capacitance gauge. However, when the material is inhomogeneously constituted, different incremental volume portions of the material have different dielectric constants. That is to say, the different incremental portions contain different numbers of mobile charge carriers, and also differ in their content of dipoles adapted to form "chains" under the influence of the locally applied electric fields. The dipole chains as well as the charge carriers which migrate to the interfaces of the incremental material portions tend to bind countercharges across the interfaces as well as at the capacitance probe electrode surfces. As a result, the local electric field is intensified in regions of the material having the high dielectric constant, whereas the field is at least partially neutralized in the regions having the low dielectric constant.

Hence in a case such as certain moisture-measurement applications, where there is a large contrast in electrical character between the substantially wet regions and the interspersed, substantially dry regions, macroscopically the capacitance gauge output responds strongly to the material in the wet regions and substantially ignores the presence of the material in the dry regions. That is to say, instead of responding to the material in all of the space $V_1$, the gauge in essence responds only to the material occupying a total space $V_1'<V_1$, which if compressed to eliminate air spaces would occupy a volume $V_2'<V_2$. Whereas in the case of a homogeneous material the capacitance gauge output is a function of the filling factor $p$ and the moisture content $q$ of the material in all of the space $V_1$, in the case of the inhomogeneous material the gauge output is a function of a false filling factor $$p'=\frac{V'_2}{V}<p$$

and a false moisture content $q'>q$. In accordance with the postulate which forms the basis of the present invention, $q'$ is greater than $q$ simply because $q'$ is the moisture content of only the wet portions of the material, whereas $q$ is the average moisture content of both the wet and the dry portions. This being the case, the true moisture content is calculable in accordance with the relation $$q=\frac{p'}{p}q'$$

The failure of the instrument of my above-referenced application to correctly indicate the true moisture content of inhomogeneous materials becomes apparent from the fact that the above equation involves three variables. It is axiomatic that three equations are required to obtain a solution where three unknown quantities are involved. However, whereas in the case of a homogeneous material the instrument derives two equations in $p$ and $q$ which are automatically solved to obtain one or both of these variables, in the case of the inhomogeneous material the instrument derives two equations in $p'$ and $q'$ which are solved for $p'$ and $q'$. While the automatically indicated values of $p'$ and $q'$ may have substantial utility for some purposes, they do not per se provide the information desired by the commerical user of the instrument, since there is not necessarily any definite correlation between $p$ and $p'$ or between $q$ and $q'$.

It also becomes apparent why conventional mass-compensation methods fail to resolve the errors introduced by the inhomogeneity effects. For example, one of the most sophisticated forms of apparatus for this purpose comprises the combination of a capacitance gauge, a mass gauge such as a radiation gauge, and a suitable computer, such as that described in Patent No. 2,920,272. Where an inhomogeneous material is involved, this combination derives one equation in $p$ from the reading of the radiation gauge, and a second equation in $p'$ and $q'$ from the reading of the capacitance gauge. It is apparent that the device of this patent as well as a number of other previously proposed devices suffers from the lack of means for generating another independent equation in $p'$ and $q'$, and a suitable computer arrangement for separating the latter two variables and making the proper mathematical combination thereof with the available value of $p$. Hence the computation actually made is bound to result in an ambiguous and erroneous indication.

In accordance with the present invention, there is provided capacitance gauge means for providing at least two separate, independent signals, each indicative of the dielectric character of a measured material. There is also provided auxiliary means for providing a signal indicative of the actual mass of the material undergoing measurement by the capacitance gauge. There is further provided computer means for suitably combining the three signals, whereby one or two constituents of the material are correctly and quantitatively indicated, despite the effects on the capacitance gauge of any inhomogeneity in the mixture, compound, or physical structure constituting the material.

It is the object of this invention to provide a system for quantitative analysis of materials by measuring the dielectric qualities thereof, whereby accurate results are obtained with both homogeneous and inhomogeneous materials.

It is also an object to provide fully automatic, continuously measuring apparatus in accordance with the above object which is unaffected by variations in the degree of non-uniformity of the material.

It is another object to provide means for compensating a dielectric gauge for the deleterious effects of inhomogeneity in the measured material without affecting the performance of the instrument when the material is homogeneous.

It is yet another object to provide a mass-insensitive dielectric gauge which is simpler and easier to calibrate than previously proposed instruments of this type.

It is still another object to provide a dual-channel dielectric gauge instrument which does not require complicated circuitry or special computer elements to prevent an erroneous reversal of its indication when the function of the ratio of the signals in the two channels passes through a point of zero slope.

Further objects and advantages will become apparent in the following detailed description of an illustrative application of the method and certain preferred apparatus in accordance with the invention, taken in conjunction with the appended drawings, in which:

FIG. 6 is a schematic diagram of one type of circuit which can be represented by the reciprocal multiplier or divider box 60 of FIG. 2.

FIG. 7 is a typical graph of a function which may be plotted for use in one method of calibrating a moisture gauge in accordance with the invention.

FIG. 8 is a typical graph of another such function.

FIG. 9 shows a modification of a portion of the apparatus of FIG. 2 in accordance with a preferred embodiment of the invention.

FIG. 10 is a schematic diagram showing the application of the present invention to a dielectric gauge system utilizing a different principle of operation.

Figure 1:
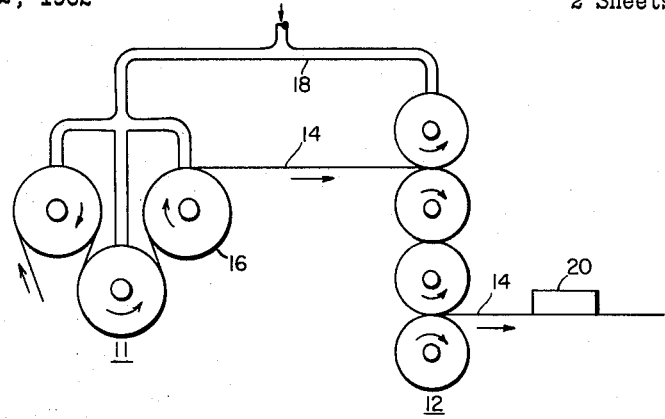
FIG. 1 is a sketch illustrating the terminal end of the dryer section and the calender section of a conventional paper making machine, showing the location of a moisture gauge thereon.

Referring to FIG. 1, there is shown a portion of a paper making machine comprising the terminal end of the dryer section 11 and the calender section 12. A formed paper sheet 14, traveling at high speed in the direction indicated, is shown issuing from the dryer section 11 and thence passing through the calender section 12, from which it is delivered to the windup (not shown) where it is wound into large paper rolls for warehousing and eventual shipment to the consumer.

It is understood that in previous stages, not illustrated, of the conventional paper making process, the sheet 14 is formed from liquidous stuff comprising more than ninety percent water and a small percentage of processed pulp. This large amount of water is removed in successive stages of vacuum draining equipment, a press roll section, and the extensive dryer section 11 wherein the sheet passes through a series of dryer rolls as at 16 which are heated by pressure-regulated steam admitted through pipes 18. By the time the sheet 14 issues from the dryer section 11 its originally high moisture content has evaporated to substantial dryness, and the sheet is then passed through the calender 12, whose rolls are also heated by steam, to impart a hard, compacted finish to the surfaces of the final sheet.

As is well known, the economics of the processes and the quality of the paper are substantially dependent on proper control of the water-removal operations, and it is thereof of great benefit to obtain an accurate, continuous measurement of the moisture content of the final sheet. To this end, a moisture gauge 20 is installed adjacent the path of the sheet 14 where it issues from the calender 12.

In accordance with this invention, the moisture gauge 20 comprises a device which is described basically in my copending application Serial No. 41,975, filed July 11, 1960. However, as a preferred embodiment I illustrate herein a gauge in accordance with the further copending application of Frederick L. Maltby, Albert F. Hanken and Donald C. Brunton, Serial No. 181,341, filed March 21, 1962.

Figure 2:
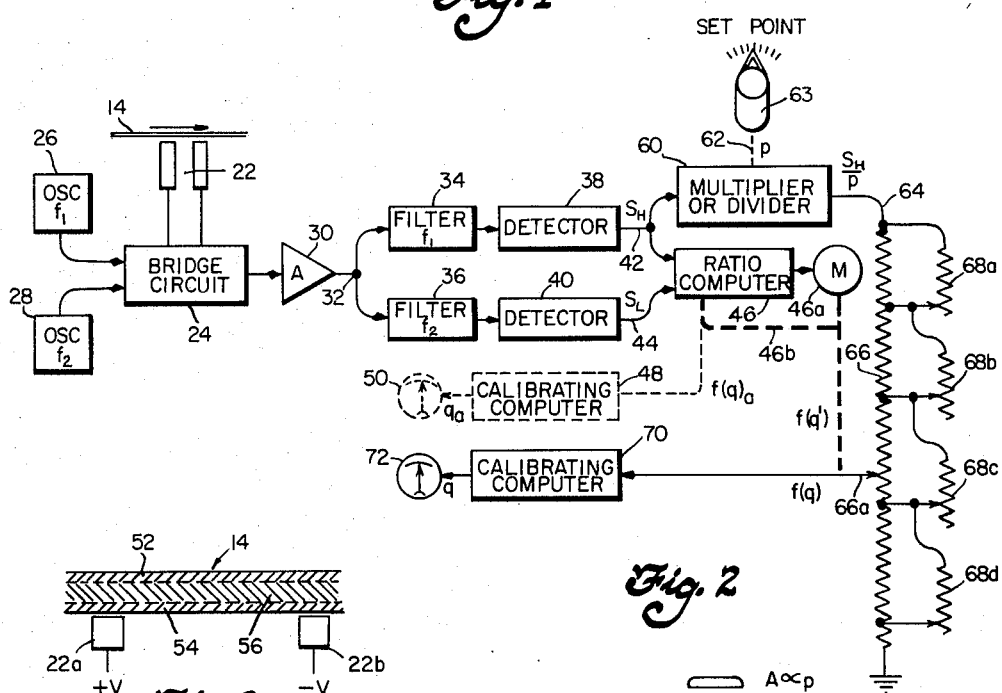
FIG. 2 is a schematic diagram of a dielectric gauge system in accordance with the invention.

This instrument is represented in a portion of FIG. 2, and comprises a capacitance gauge or dielectric gauge including a spray field capacitor probe 22 positioned adjacent to the traveling paper sheet 14. The capacitance probe is connected in a bridge circuit 24 which is energized by two oscillators 26 and 28 or other voltage sources providing alternating voltages at two substantially different frequencies $f_1$ and $f_2$. The bridge circuit 24 is connected to an amplifier 30 which provides an output signal on line 32. This output signal contains components indicative of the extent of the unbalanced condition of the bridge at each of the two frequencies $f_1$ and $f_2$. These components are separated by filters 34 and 36 and detected at 38 and 40 to provide individual signals $S_H$ and $S_L$ on lines 42 and 44. In essence, these signals are defined by:

$$S_H = p f_H(q) \qquad (1)$$
and
$$S_L = p f_L(q) \qquad (2)$$

In these expressions, as explained hereinabove, $p$ is called the "filling factor," and is directly proportional to the mass per unit area, or, roughly, the thickness of the paper sheet 14. The quantity $q$ is the percentage moisture content in the sheet, and the functions of $q$ are given in essence by:

$$f_H(q) = k_H - 1$$
and
$$f_L(q) = k_L - 1$$

where $k_H$ is the complex "dielectric constant" of the sheet when measured at the higher frequency of the two frequencies $f_1$ and $f_2$, and $k_L$ is the complex "dielectric constant" of the sheet at the lower of the two frequencies. It is to be understood that $k_H$ and $k_L$ are both variables dependent on the moisture content $q$ of the sheet.

The signals $S_H$ and $S_L$ are delivered to a simple analog ratio computer 46 which solves Equations 1 and 2 to obtain in essence the following result:

$$f(q) = \frac{S_H}{S_L} \qquad (3)$$

which eliminates the variable $p$ and provides an analog which is a function of the moisture content per se. The ratio computer 46 may be of a conventional design similar to that described in Patent No. 2,790,146, employing a readout servo-mechanism including a rebalancing servo motor 46a and a mechanical feedback connection 46b. The analog of the quotient $f(q)$ is represented by the spatial position of the linkage 46b.

For purposes of comparison with the device of the present invention, the dotted lines indicate a calibrating computer 48 and a readout indicator 50. Computer 48 is provided to linearize the non-linear function $f(q)_a$ indicated by the position of linkage 46b and to introduce the proper scale factor. While computer 48 is herein illustrated as a separate device to simplify the explanation, it will be understood that its functions may be incorporated in the ratio computer 46. By this means an analog signal $q_a$ is provided to the indicator 50 for manifesting the moisture content. The meaning of the subscript $a$ is brought out in the following discussion of the problem solved by the present invention.

The instrument so far described has proved capable of indicating the moisture content in paper and other materials with unprecedented accuracy and reproducibility. However, in making measurements on the output of a high-speed machine producing a heavy paper such as kraft, we have observed that the instrument renders abnormally high and erroneous readings. I have discovered that this difficulty is caused by moisture stratification in the paper occurring as a result of the moisture removal operations involved.

Figure 3:
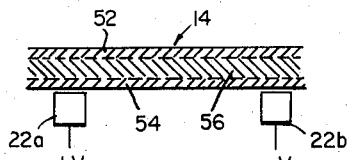
FIG. 3 is a sketch representing a section of the paper sheet produced by the machine of FIG. 1 in the moisture measurement zone, illustrating moisture stratification in the sheet which renders the material inhomogeneous.

In FIG. 3 there is represented an enlarged section of the paper sheet 14 as it issues from the calender 12 of FIG. 1. The above-referenced moisture stratification is illustrated by the representations of two surface layers 52 and 54 with a third layer 56 sandwiched in between. What apparently occurs is that the surface layers 52 and 54 are almost completely dried by contact with the heated rolls of the dryer 11 and calender 12 and exposure to the atmosphere. However, due to the speed with which the sheet 14 travels, when the paper is measured by gauge 20, the moisture in the middle layer 56 has not had time to migrate outwardly toward the surfaces and thereby achieve uniform moisture distribution throughout the total thickness of the sheet.

It is now believed that a fair estimate of typical quantitative values can be given as an example. The dry layers 52 and 54 together may constitute about one-half of the total weight of the sheet, with the wet layer 56 constituting the other half. The moisture content of the dry layers is about zero percent to two percent. The moisture content in the wet layer 56 is about eight to ten percent. Hence the average moisture content of the paper is about four percent, and eventually this becomes uniformly distributed through the paper after the rolls thereof are placed in storage. If these values are assumed to prevail, then obviously the moisture gauge should indicate the value $q$ at about four percent. However, it is found that the reading actually obtained, designated $q_a$ or apparent moisture content, is much closer to the eight percent value which prevails in the wet layer 56.

No attempt is made herein to fully analyze this phenomenon, which is very complex and only partially understood. However, in order to gain some appreciation of the mechanisms probably involved, it is appropriate to set forth a simplified physical model which is presented as an elementary, partial explanation of what is believed to occur.

Figure 4:
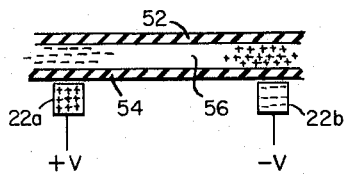
FIG. 4 is a sketch similar to FIG. 3, depicting a simplified model of certain electrical mechanisms operative in the measuring zone of the sheet.

It is well known that field lines are always concentrated in regions of low impedance. In FIG. 4, the dry surface layers 52 and 54 are postulated to contain substantially only tightly bound charge carriers, thereby constituting virtual insulators. By comparison, the wet layer 56 contains a substantial supply of highly mobil charge carriers, and thereby constitutes a relatively good conductor sandwiched between the insulating layers. Now when the alternating voltage V is applied between the electrodes 22a and 22b of probe capacitor 22, the mobile charge carriers in the wet layer 56 tend to pile up on the interfaces of the wet and dry layers in the regions adjacent to the electrodes. Thus if the potential $+V$ applied to the electrode 22a is positive-going, as illustrated, the negative charge carriers quickly migrate to the interface in the region adjacent to this electrode and the positive carriers migrate to the interface region adjacent to electrode 22b having the negative-going potential $-V$ applied thereto.

At least for an interval in accordance with a certain complex time-constant $\tau$, the charge accumulations in the interface regions tend to cancel portions of the electric spray field which would otherwise permeate the material adjacent the electrodes of the probe capacitor 22. Under these conditions, the regions of strong polarization which obtain are somewhat as illustrated by the hatched areas in FIG. 5, that is, in small portions of the dry layer 54 adjacent to the electrodes 22a and 22b, and in a substantial-sized central region of the wet layer 56. It is noteworthy that it is the latter moist region which contains most of the permanent electric dipoles consituted by unbound water molecules, whose polarization accounts for so much of he real dielectric constant of the wet paper sheet.

As a result of this situation, the relations of Equations 1 and 2 are no longer true, and the signals $S_H$ and $S_L$ are now given essentially by:

$$S_H = p' f_H(q') \qquad (4)$$

and $$S_L = p' f_L(q') \qquad (5)$$

Figure 5:
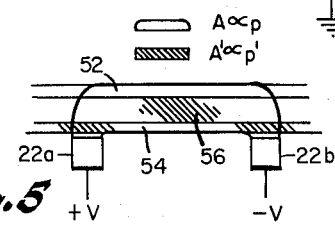
FIG. 5 is a sketch similar to FIGS. 3 and 4 depicting regions of strong and weak polarizing fields in the measuring zone of the sheet.

Here $p'$ is a false filling factor which is proportional to the hatched area $A'$ in FIG. 5, whereas if the sheet 14 had a homogeneous moisture content the true filling factor $p$ would be proportional to area $A$, enclosed by the heavy solid line, wherein the material would all be subject to the electric spray field from the charged capacitor 22 electrodes. Similarly $q'$ is a false moisture content, which is in fact the average moisture content of only that portion of the material indicated by the hatched area $A'$. Thus it is apparent that the true average moisture content $q$ is given by $$q = \frac{p'}{p} q' \qquad (6)$$

This relation being understood, it is apparent that the false moisture reading $q'$ can be corrected simply by multiplying the same by the ratio $p'/p$. In this connection it is noted that the variable $p'$ appears as a factor in either of Equations 4 and 5. However, the true filling factor $p$ apparently cannot be derived from the dielectric gauge indications and hence must be obtained from an auxiliary information source.

By multiplying both the numerator and the denominator of Equation 6 by $f_H(q')$ and substituting $S_H$ for its equivalent from Equation 4, the true moisture content is given by:

$$q = \frac{p' f_H(q')}{p f_H(q')} q' = \frac{S_H}{p f_H(q')} q' \qquad (7)$$

which states that the false moisture indication $q'$ can be corrected by multiplying the same by the ratio $$\frac{S_H}{pf_H(q')} \quad (8)$$

Obviously this does not means that one must first fully compute or isolate the quantity $q'$ before such a multiplication can be made. It is recalled that in the heretofore described FIG. 2 apparatus the signals $S_H$ and $S_L$ are combined to form the ratio $S_H/S_L$ which describes the function $f(q)_a$. When the paper sheet has a homogeneous moisture content, $f(q)_a$ is a function of the true moisture content $q$, that is, $f(q)_a=f(q)$. When the paper sheet has a non-uniform moisture content, $f(q)_a$ is a function of the falsely indicated moisture content $q'$, that is, $f(q)_a=f(q')$. Thus it is apparent that the same result may be obtained by multiplying the $q_a$ output of computer 48, or the position analog output $f(q)_a$ of the ratio computer, or the signal $S_H$ by the ratio (8) above. Likewise the signal $S_L$ may be multiplied by the reciprocal of ratio (8) or a further equivalent mathematical operation can be performed in a suitably modified version of the ratio computer 46 per se, or no doubt still other methods will occur to one skilled in the art.

In FIG. 2 I have chosen to illustrate apparatus for performing the computation in accordance with the second of the above-listed methods wherein the required mathematical operation is performed on the position analog $f(q)_a=f(q)$. To this end there is shown generally a box 60 representing a suitable multiplier or divider circuit which receives the signal $S_H$ on line 42 and also receives an analog signal, indicated, say, by the position of a mechanical connection 62, representing the value of the true filling factor $p$. Since $p$ is proportional to the basis weight of the paper sheet 14, in many cases a sufficiently close approximation to the value of $p$ may be obtained from the setting of a manually adjusted dial 63 graduated in units of weight per unit area. This is true in particular when the basis weight is maintained relatively constant at a desired value by suitable automatic control devices. The output of box 60 is an analog voltage on line 64 indicative of the value of the ratio $S_H/p$ constituting one factor in the ratio (8). This signal is delivered to a potentiometer 66 having a movable tap 66a which is driven by the ratio computer servomechanism mechanical link 46b so that the tap 66a moves in accordance with the position analog $f(q')$.

There is shown associated with potentiometer 66 a plurality of padding potentiometers 68a–68d whereby potentiometer 66 is loaded so that its resistance varies along its "length" in a non-linear manner in accordance with the function $1/f_H(q')$ constituting the other factor in the ratio (8). By these means there is made available at the tap 66a an electrical voltage analog of $f(q)$, said voltage being essentially independent of variations in both the mass and the degree of inhomogeneity of the material and indicative of the true average moisture content $q$ per se.

More specifically, the analog voltage representing $f(q)$ is given in essence by $$f(q) = \frac{k_H - 1}{k_L - 1} = \frac{g_1(q) - 1}{g_2(q) - 1} \quad (9)$$

where $k_H$ represents the average dielectric constant of the sheet at the high frequency, and varies as a first function $g_1(q)$ of the average moisture content, and $k_L$ represents the average dielectric constant of the sheet at the low frequency and varies as a second function $g_2(q)$ of the average moisture content. This signal may be fed into a suitable calibrating computer 70 which linearizes the function $f(q)$ and permits selection of a desired scale factor, whereby a signal representing the value of $q$ may be read out by means of a suitable indicating or recording instrument 72.

While the multiplier or divider box 60 may be embodied in any one of a plurality of forms well-known in the art, perhaps the most obvious and straightforward apparatus design is shown in FIG. 6. If it is anticipated, for example, that the value of $p$ will vary between limits of not less than 0.2 nor more than 0.8, the corresponding variation of $S_H/p$ is between $5S_H$ and $1.25S_H$. Accordingly the signal $S_H$ on line 42 may be fed to an operational amplifier 74 having values of its input and feedback resistors $R_i$ and $R_f$ selected to provide a closed-loop gain of greater than five. The amplifier output is applied across limit potentiometers 76 and 78. A weight selector or set point potentiometer 80 is connected across the taps of potentiometers 76 and 78, and the tap of the weight-selector potentiometer 80 is mechanically coupled to a weight-selector knob 82 and a pointer 84 which cooperates with a graduated scale 86 marked off in reciprocally spaced units of weight per unit area. The pointer and scale is calibrated by means of potentiometers 76 and 78 so that when the pointer is set to any position on scale 86 a voltage representing the proper ratio $S_H/p$ appears on line 64 which is connected to the tap of potentiometer 80.

It appears from the foregoing that in order to make the inhomogeneity correction in accordance with Equation 7 it is necessary directly or indirectly to determine the function $1/f_H(q')$ disassociated from the unknown value of $p'$ which is a factor in the signal $S_H$ and $S_L$. Some such determination is of course necessary in order to find the required settings of the padding potentiometers 68. Apparently this would be extremely difficult if not impossible except for the fact that in the limiting case where the moisture content is perfectly uniform throughout the material, the value of $q'$ is identical with that of $q$.

In accordance with one procedure, consider that $$S_H = pf_H(q) = kmf_H(q)$$

where $k$ is a constant and $m$ is the mass per unit area of the paper. Using substantially absolutely dry samples of various weights in the gauge, one may plot a curve as shown in FIG. 7 which is the straight line best fitting the plotted points relating the mass per unit area $m$ to the observed value of $S_H$. Any two convenient points on this line then determine its slope in accordance with the equation $$kf_H(q_o) = \frac{S_{H2} - S_{H1}}{m_2 - m_1}$$

where $q_o$ indicates zero moisture content in the paper. Using this relation, and samples of various moisture contents which have been in hermetic storage for a sufficient length of time to assure absolute moisture homogeneity, one may obtain a curve as shown in FIG. 8 which relates the moisture content $q$ of the samples to the calculated values of $S_H/mkf_H(q_o)$. The resulting curve determines the function $f_H(q)$, which, because of the fact that the moisture content of the samples is homogeneous, is identical with $f_H(q')$. The ordinate values from this curve are then used to plot the required potentiometer loading function in the usual manner.

While FIG. 2 shows the loaded potentiometer 66 in its elementary form only, providing a line-segment approximation to the desired curve, the approximation can be made as close as desired by increasing the number of padding potentiometers 68. One may also employ more sophisticated devices of the type which are well known in the art; for example, see U.S. Patent No. 2,871,429, noting that any or all of the patentee's X, Y and Z potentiometers can be driven at once by the ratio computer servo motor 46a.

The foregoing description has been provided in order to illustrate in specific detail how one may provide apparatus to automatically implement the required computations in a straightforward manner. However, on detailed examination it becomes apparent that the apparatus of FIG. 2 is somewhat more complicated than necessary to meet its actual requirements. In particular it is noted that the servo-operated potentiometer 66 is provided to perform a non-linear mathematical operation on the signal representing $S_H/p$ and that a further computer 70 is provided simply to linearize and introduce suitable scale factors for the voltage signal on the potentiometer tap 66a representing the non-linear function $f(q)$. Hence it is apparent that both functions can be combined in a single non-linear device which is properly calibrated. Also, while a strictly arithmetic multiplication, say, of $S_H$ by values of $1/p$ where $p<1$ must result in a signal larger than $S_H$ and thus implies a necessity for amplification, it is apparent that the magnitude of $S_H$ is only arbitrary and that a signal of smaller magnitude but strictly proportional to $S_H/p$ is readily obtainable without any amplification. Hence a preferred embodiment of the invention, such as that shown in FIG. 9, can be considerably simplified.

In FIG. 9 there is illustrated a computer 100 which is preferably associated with a servo motor 102 which drives a mechanical connection represented by the dotted line 104. This showing of a computer box and motor is meant to represent any device adapted to drive the mechanical connection 104 to a position representing any equivalent of a function of a ratio of the two signals $S_L$ and $S_H$, for example the ratio $S_L/S_H$ or the ratio $$\frac{S_L - S_H}{S_H} = \frac{S_L}{S_H} - 1$$

Reference to my copending application Serial No. 107,794, filed May 4, 1961, or to that of Alan Norwich, Serial No. 174,745, filed February 21, 1962, provide two examples of various schemes whereby an equivalent ratio computation can be continuously performed without in fact feeding two variable signals into a ratio computer per se.

The mechanical output connection 104 therefore moves in accordance with some function $f(q')$ of moisture content independently of mass variations. Connection 104 drives the movable arm 106a of a non-linear potentiometer 106. This potentiometer is arranged and calibrated, utilizing means represented by padding potentiometers 108a-108d, so that its resistance varies non-linearly along its length in accordance with the combined variation of the functions $1/f_H(q)$ and $f(q)$. Potentiometer 106 is energized by a voltage obtained from the variable tap 110a of a potentiometer 110 having the signal voltage $S_H$ applied directly across the same.

In order that the voltage from potentiometer tap 110a will be proportional to $S_H/p$ in spite of continuous variations in the basis weight of the paper sheet 14 issuing from the calender 12, a continuous mass indication is obtained from a gauge such as radiation thickness gauge. To this end a gauging head 112, comprising for example a conventional beta radiation source and detector unit, is mounted adjacent to the moisture gauging head 20a, whereby the mass per unit area of the paper sheet 14 is continuously registered on an interconnected recording instrument 114. The indicator 114a of the recorder 114 continuously drives the movable tap 110a of potentiometer 110 through a mechanical connection represented by the dotted line 116. Assuming that the recorder indication varies linearly with the mass per unit area of the paper sheet and therefore with the filling factor $p$, potentiometer 110 comprises a conventional inverse function potentiometer to provide a voltage on its tap 110a which is proportional to $S_H/p$. It is now apparent that the voltage obtained from the movable tap 106a of the padded potentiometer 106 is directly proportional to the true moisture content $q$, whether the moisture distribution in the paper 14 is homogeneous or inhomogeneous. This last mentioned voltage may be utilized by a simple linear meter, recorder or control device for the paper making machine, such a utilization device being represented at 118.

In my copending application Serial No. 41,975, I have shown that the ratio $f(q)$ of Equation 3 above is a double-valued function, in that the ratio increases with $q$ up to about twelve to fifteen percent moisture, and then decreases with further increases in $q$. Said application discloses special computer elements to correct the resulting ambiguity. In most applications, such as the measurement of moisture in paper, these special elements are not ordinarily provided, since it is considered accidental when the paper moisture increases to values which force $f(q)$ "over the hump." However, an erroneous downscale indication in such accidental circumstances is highly undesirable. An incidental object and advantage of the present invention is that such an occurrence is automatically avoided, since the decrease in the $f(q)$ ratio at high moisture content is compensated for by the concomitant exponential increase in the signal $S_H$.

Throughout this specification, the terms "capacitance gauge" and "dielectric gauge" are used somewhat loosely and interchangeably to refer to any instrument which measures physical variables related to the complex dielectric constant of materials. The terms "dielectric constant" per se generally designates the complex dielectric constant $k = k' + jk''$ having both real and imaginary components. The terms "measuring capacitor," "capacitance probe," or "probe capacitor" generally designate a set of electrodes placed adjacent to or in contact with the measured material and thereby constituting an electrical load having a negative reactance component, that is, a load which acts like a combination of resistance and capacitance. Physically, such a probe may resemble either a capacitor per se or a pair of resistance terminals. The dual-frequency instrument described hereinabove measures the total probe current including both the component which is in phase with the applied voltage and the quadrature component. Depending on the measured material, the amount of moisture content or other measured constituent, and the frequency employed, either the so-called equivalent series resistance of the probe or the capacitive reactance thereof may be the most effective determiner of the instrument response.

It is to be noted that the present invention is not restricted to a dual-frequency instrument, but is applicable to any dielectric gauge system capable of indicating one or more properties or constituents of a measured material independently of mass variation therein. For example, referring to FIG. 10 there is illustrated an embodiment of the invention in combination with an abbreviated showing of the dielectric gauge disclosed in Patent No. 2,535,027 issued to W. C. Anderson.

This gauge includes a capacitance probe 130 adapted to have a dielectric material 132 passed therethrough. Probe 130 is connected in a bridge circuit 134 which is energized by a single oscillator 136. The output of the bridge is received by two phase discriminators 138 and 140 which also receive phase reference signals from oscillator 136. The phase discriminator outputs are utilized by respective electromechanical servos 142 and 144 which, as indicated by dotted connections 146 and 148, make automatic rebalancing adjustments in the bridge 134. The position of servo 142 provides an analog of the quantity $\Delta R_s = R_{sa}' - R_{so}$ where $R_{so}$ is the equivalent series resistance of the empty probe 130 and $R_{sa}'$ is its equivalent series resistance with the measured material therein. Similarly the position of servo 144 provides an analog of the quantity $\Delta C = C_a' - C_0$ where $C_0$ is the capacity of the empty probe 130 and $C_a'$ is its capacity with the measured material therein. The patentee discloses that the position analog signals may be fed to a computer for obtaining the ratio $\Delta R_s / \Delta C$ which is a function of moisture content independent of mass variations.

Using a notation similar to that previously employed herein, in this case $$\Delta R_s = p f_R(q)$$

$$\Delta C = p f_C(q)$$

and $$\frac{\Delta R_s}{\Delta C} = \frac{f_R(q)}{f_C(q)} = k(q)$$

where the material has a homogeneous moisture content. Where the material has an inhomogeneous moisture content, we obtain signals $$\Delta R'_s = p' f_R(q')$$

and $$\Delta C' = p' f_C(q')$$

whose ratio is expressed as $k(q')$. Again the correction is made by multiplying the false moisture content $q'$ or its function $k(q')$ by the ratio $$\frac{p'}{p} = \frac{p' f_R(q')}{p f_R(q')} = \frac{\Delta R'_s}{p} \cdot \frac{1}{f_R(q')}$$

Accordingly in FIG. 10 a voltage from a source 150 is applied to a potentiometer arrangement 152 which is driven through a mechanical connection 154 by the servo 142. This well known device converts the position analog of $\Delta R'_s$ to an electrical voltage analog $E_{\Delta R'}$. This voltage and a signal representing $p$ are utilized by a multiplier or divider represented by box 156 to provide a voltage representing $\Delta R'_s/p$ to a padded potentiometer 158 which is driven by the servomechanism of a ratio computer 160 to a position representing $k(q')$, whereby the padded potentiometer provides an output voltage proportional to the true moisture content $q$.

While the invention has been shown and described in connection with a few specific embodiments, such showing and description is meant to be illustrative only and not restrictive, since obviously many changes and modifications can be made to the disclosed apparatus, and numerous, outwardly quite different embodiments can be constructed without departing from the scope of the invention as is set forth in the appended claims.

What is claimed is:

1. In a system for measuring the variable composition of a material having plural constituents, dielectric gauge means for providing an indication of said composition which is independent of variations in the mass of said material, means providing an indication of said mass, and means utilizing said mass indication to correct said composition indication for errors caused by inhomogeneous mixing of said constituents in said material.

2. In a system for measuring the variable composition of a material having plural constituents and a variable mass, dielectric gauge means for providing at least two independent signals each being a function of both said mass and said composition, auxiliary means for providing an indication of said mass, and means for combining said mass indication with both of said dielectric gauge signals to provide an indication of said composition which is independent of the effect on said dielectric gauge signals of inhomogeneous mixing of said constituents in said material.

3. In a system for measuring the variable composition of a material having plural constituents and a variable mass, dielectric gauge means for providing two independent signals each being a function of both said mass and said composition, means for computing a function of the ratio of said signals to provide an indication of said composition which is independent of said variable mass, auxiliary means for providing an indication of said mass, means for modifying one of said signals in proportion to said mass indication, and non-linear computer means for combining said composition indication and said modified signal to provide a modified composition indication which is independent of the effect on said dielectric gauge signals of inhomogeneous mixing of said constituents in said material.

4. In a system for measuring the variable composition of a material having plural constituents and a variable mass, dielectric gauge means exhibiting a response to both said mass and said composition for providing an indication of said composition which is independent of variations in said mass, means for multiplying said composition indication by a non-linear empirical function relating said response to said composition to provide a product indication, means for providing an indication of said mass, and means for multiplying said product indication by an inverse function of said mass indication to provide an output indication of said composition which is corrected for errors caused by inhomogeneous mixing of said constituents in said material.

5. In a system for measuring the variable composition of a material having plural constituents and a variable mass, dielectric gauge means for providing two independent signals each being a function of both said mass and said composition, means for computing a function of the ratio of said signals to provide an indication of said compositon which is independent of said variable mass, means for multiplying said composition indication by a non-linear empirical function relating one of said independent signals to said compositions to provide a product indication, auxiliary means for providing an indication of said mass, and means for multiplying said product indication by an inverse function of said mass indication to provide an output indication of said composition which is corrected for errors caused by inhomogeneous mixing of said constituents in said material.

6. In a system for measuring the variable composition of a material having plural constituents and a variable mass, dielectric gauge means for providing two independent electrical signals each being a function of both said mass and said composition, servomechanism means for computing a function of the ratio of said signals to provide a mechanical output indication of said composition which is independent of said variable mass, potentiometer means having a variable element driven by said mechanical output for generating a non-linear empirical function relating one of said independent signals to said composition, auxiliary means for providing an indication of said mass, means for multiplying said one independent signal by an inverse function of said mass indication to provide an input signal to said potentiometer, and an output connection on said potentiometer for providing an electrical output signal indicating said composition independently of the effect of said dielectric gauge signals of inhomogeneous mixing of said constituents in said material.

7. In an apparatus for measuring the variable composition of a material having plural constituents and a variable mass, the combination, with a dielectric gauging system energized by two significantly different frequencies for providing two signals each being variable as a function of said mass and the complex dielectric constant of said material at a respective one of said frequencies, of means for providing an indication of said mass, means for modifying one of said signals as a function of said mass indication, means for computing a function of the ratio of said two signals, and means for combining said computed ratio function with said modified signal to provide an indication of said composition which is independent of the effect on said dielectric gauge signals of inhomogeneous mixing of said constituents in said material.

8. In an apparatus for measuring the variable composition of a material having plural constituents and a variable mass, said apparatus including a dielectric gauging system energized by two significantly different frequencies for providing first and second signals $S_H$ and $S_L$ which are both variable as a function of said mass and also variable respectively as functions of the complex dielectric constants of said material at the higher and lower of said frequencies, said system further including means for providing a third signal which is a function of a ratio of said first and second signals, the improvement comprising auxiliary means for providing an indication of said mass, means for modifying one of said three signals in proportion to said mass indication, means for multiplying said third signal by a non-linear empirical function relating a selected one of said first and second signals to said composition to provide a product signal, and means for combining said product signal and said selected signal to provide an indication of said composition which is independent of said mass and independent of the effect on said first and second signals of inhomogeneous mixing of said constituents in said material.

9. In an apparatus for measuring the variable composition of a material having plural constituents and a variable mass, said apparatus including a dielectric gauging system energized by two significantly different frequencies for providing first and second signals $S_H$ and $S_L$ which are both variable as a function of said mass and also variable respectively as functions of the complex dielectric constants of said material at the higher and lower of said frequencies, said system further including servomechanism means for computing a function of the ratio of said signals to provide a mechanical output indication of said composition which is independent of said variable mass, potentiometer means having a variable element driven by said mechanical output for generating a non-linear empirical function relating one of said signals to said composition, auxiliary means for providing an indication of said mass, means for multiplying said one signal by an inverse function of said mass indication to provide an input signal to said potentiometer, and an output connection on said potentiometer for providing an electrical output signal indicating said composition independently of the effect on said first and second signals of inhomogeneous mixing of said constituents in said material.

10. In a system for measuring the variable moisture content of a material, dielectric gauge means for providing an indication of said moisture content which is independent of the mass of said material but subject to errors due to inhomogeneous distribution of said moisture content therein, means providing an indication of said mass, and means utilizing said mass indication to correct said errors in said moisture content indication.

11. In a system for measuring the average moisture content of sheet material and the like which may be formed with a substantially dry layer and a substantially wet layer, dielectric gauge means for providing an indication of moisture in said material which is independent of the mass thereof but subject to errors due to the effect of said layer formation on said dielectric gauge, means providing an indication of the mass per unit area of said material, means utilizing said mass indication to correct said moisture indication for said errors, and means for manifesting said corrected indication.

12. In a system for measuring the variable moisture content of a material, dielectric gauge means for providing a signal indicative of said moisture content, said signal being independent of the mass of said material but subject to errors due to inhomogeneous distribution of said moisture content therein, means providing a signal indicative of said mass, and means for combining said mass and moisture content indicative signals to provide a corrected signal indicative of the average moisture content in said material.

13. In a system for measuring the average moisture content of sheet material and the like which may be formed with a substantially dry layer and a substantially wet layer, dielectric gauge means for providing a signal indicative of moisture in said material, said signal being independent of the mass thereof but subject to errors due to the effect of said layer formation on said dielectric gauge, means providing a signal indicative of the mass per unit area of said material, and means for combining said mass and moisture indicative signals to provide a corrected signal indicating the true average moisture content of said material.

References Cited by the Examiner

UNITED STATES PATENTS

| | | | |
|---|---|---|---|
| 2,535,027 | 12/1950 | Anderson | 324—61 X |
| 2,920,272 | 1/1960 | Erdman et al. | 324—61 |
| 2,923,881 | 2/1960 | Bernet | 324—61 |
| 2,948,850 | 8/1960 | Ederer | 324—57 |
| 2,966,628 | 12/1960 | Bosch | 324—61 |
| 3,143,886 | 8/1964 | Lipple | 324—61 X |

FOREIGN PATENTS 217,898  10/1958  Australia.

WALTER L. CARLSON, *Primary Examiner.*

ADDISON E. RICHMOND, *Assistant Examiner.*

UNITED STATES PATENT OFFICE
CERTIFICATE OF CORRECTION

Patent No. 3,249,865　　　　　　Dated　May 3, 1966

Inventor(s) Albert F. Hanken

It is certified that error appears in the above-identified patent and that said Letters Patent are hereby corrected as shown below:

Column 1, line 39, "combing" should read ---combining---;
column 1, lines 66 and 67, "exceds" should read ---exceeds---.
Column 2, line 13, "surfces" should read ---surfaces---;
column 2, line 68, "effects" should read ---effect---.
Column 4, line 31, "processes" should read ---process---.
Column 5, lines 10 and 11, "analog which" should read ---analog signal which---.
Column 6, line 36, "he" should read ---the---.
Column 7, line 29, "=f(q)." should read ----=f(q').---
Column 12, line 20, "compositions" should read ---composition---.

SIGNED AND
SEALED

JUL 28 1970

(SEAL)
Attest:

Edward M. Fletcher, Jr.
Attesting Officer

WILLIAM E. SCHUYLER, JR.
Commissioner of Patents